United States Patent [19]

Ohkubo

[11] 4,225,928
[45] Sep. 30, 1980

[54] SYSTEM FOR AUTOMATICALLY POSITIONING THE CARRIAGE OF A MACHINE IN NUMERICAL CONTROL SYSTEM AT A REFERENCE POINT

[75] Inventor: Tetsuo Ohkubo, Tokyo, Japan

[73] Assignee: Oki Electric Industry Co., Ltd., Tokyo, Japan

[21] Appl. No.: 914,616

[22] Filed: Jun. 9, 1978

[30] Foreign Application Priority Data

Jun. 16, 1977 [JP] Japan .................................. 52-70482

[51] Int. Cl.² .............................................. G05B 11/18
[52] U.S. Cl. .................................... 364/474; 318/594; 318/600; 364/110; 364/114
[58] Field of Search ....................... 364/110, 114, 474; 318/569, 592-595, 600, 660

[56] References Cited

U.S. PATENT DOCUMENTS

| 3,142,018 | 7/1964 | Eisengrein | 318/593 |
| 3,308,360 | 3/1967 | Vanderbilt | 318/592 |
| 3,566,239 | 2/1971 | Taniguchi | 318/593 |
| 3,586,950 | 6/1971 | Prodel | 318/594 |
| 3,686,547 | 8/1972 | Kelling | 318/594 |
| 3,850,105 | 11/1974 | Aronstein et al. | 318/592 X |
| 3,986,091 | 10/1976 | Quiogue et al. | 318/594 |

*Primary Examiner*—Joseph F. Ruggiero
*Attorney, Agent, or Firm*—Frailey & Ratner

[57] ABSTRACT

When the carriage of a machine is positioned at the reference position of the machine through coarse positioning and fine positioning, coarse positioning is first carried out so that the carriage can move in either direction according to the initial position of the carriage. The movement of the carriage is sensed by the combination of a platform mounted on the bed of the machine and a micro switch mounted on the carriage. The carriage is first moved at high speed and, when the carriage passes the reference point, it is moved at slow speed to return to the reference point. When the carriage again passes the reference position, coarse positioning finishes and fine positioning begins. In order to ensure coarse positioning in either direction and the change of direction of the carriage, a direction circuit is provided in a control unit of a numerical control system.

5 Claims, 7 Drawing Figures

SYSTEM FOR AUTOMATICALLY POSITIONING THE CARRIAGE OF A MACHINE IN NUMERICAL CONTROL SYSTEM AT A REFERENCE POINT

BACKGROUND OF THE INVENTION

The present invention relates to a system ensuring automatic positioning of a bit-carrying carriage at the reference position of a machine using a numerical control system.

When an automatic tool changer or automatic pallet changer is mounted on a numerically controlled machine tool, or when the zero point of program is to be provided, in order that its function be performed, it is necessary for the carriage of the machine be positioned at the reference position of the machine. Automatic positioning is also necessary when the power switch of the numerically controlled machine is initially turned on.

For example, in the case of a machining center with three spindle controls, X, Y, and Z, and also in the situation of positioning the automatic tool changer at the zero point, the spindles Y and Z are to be positioned at their respective zero points or reference positions. Also, when an automatic pallet changer is to be positioned at the zero point, the spindle X must also be positioned at its zero point. Thus, in a prior art, each spindle usually had to be positioned at its respective zero point or reference position. The following is a description of a system of positioning at the zero point of the machine tool, using a conventional numerical control system with reference to FIGS. 1, 2, and 3. For the sake of simplicity, a description is provided for one spindle, but it will be understood that the same principle applies to all other spindles.

FIG. 1 illustrates a simplified block diagram of a numerical control device with one spindle. In the figure, the reference numeral 11 is the NC data input unit that transmits NC data via paper tape or push-buttons for positioning at the zero point of the machine. Numeral 12 is the control device into which the NC data and the signals from the location sensor 17 and from the location detector 18 are input. The sensor 17 is called the first sensor and operates as a coarse sensor; the detector 18 is called the second sensor and operates as a fine sensor. The control unit is connected to the motor drive unit 13. Numeral 14 is the motor that drives the carriage 16. The sensor 17 transmits a binary code to the control unit 12 upon detecting the traveling condition of the carriage 16 in relation to the fixed machine bed 15. If a micro switch is provided on the sensor 17, the output signal of the sensor 17 will be either an ON or OFF signal.

The location detector 18 (second sensor) detects the instantaneous location of the carriage 16 and transmits a signal to the control unit 12. The location detector 18 can be, for instance, implemented by an inductosyn, manufactured by Inductosyn Corporation of U.S.A. The inductosyn has a fixed printed pattern having 2 mm pitch and a slidable portion having 3 kHz triangular wave generator. The inductosyn compares to the phase on the fixed portion with that of the slidable portion and permits fine detection of the instantaneous location. It should be noted that the inductosyn cannot provide the absolute value of the location, but can only detect the relative location within a given scale.

FIGS. 2 and 3 illustrate the conventional positioning system. In those drawings, 19a and 19b are platforms provided on the machine beds 15 close to the zero point or the reference position of the machine. The platform, which is sometimes called a "dog", projects from the fixed bed of the machine. It functions to change the output of the sensors, 17, 17a and 17b located underneath the carriage 16. At the end of the machine bed 15, a wall 20 is provided to operate as a stroke-end for the carriage 16. The device in FIG. 3 has two sensors 17a and 17b instead of a single sensor 17 as in FIG. 2; these two sensors 17a and 17b operate in sequence as the carriage 16 travels.

Because the carriage 16 is far from the zero point of the machine, as shown in FIG. 2, there is no signal from the sensor 17. When the positioning NC data is applied from the input unit 11, the control unit 12 commands the drive unit 13 to drive the carriage 16 at rapid speed in the direction of the arrow as programmed or as instructed by the positioning NC data. When carriage 16 travels, the platform 19a is effective to cause the sensor 17 to output the signal "ON", indicating that the carriage 16 is close to the previously mentioned zero point. The control unit 12 then commands the carriage 16 to travel in the same direction at slow speed. The carriage 16, which has been traveling at rapid speed, overruns by inertia, even after it has been switched to slow speed. However, this force is absorbed during the course of slow-speed operation. As the carriage 16 travels past the platform 19a, in the same direction at slow speed, the output signal of the sensor 17 changes to "OFF", and the control unit 12 then recognizes that the carriage 16 is positioned at the reference pitch point. The above positioning procedure using a platform or a dog is the so-called coarse positioning. After a coarse positioning is finished, fine positioning is performed using the inductosyn. In FIG. 2, the reference pitch point is established at a point just past said platform 19a and is taken as the zero point or the reference position of the machine.

In the rapid traveling phase, the carriage moves, for instance, at a speed of 10 meters per minute, and in the slow traveling phase the carriage moves, for instance, at a speed of 0.18 meters per minute. Coarse positioning establishes the position to within 0.2–0.3 mm. This error is inevitable because of the use of a rough micro switch as a sensor. Fine positioning, employing the inductosyn, is performed after coarse positioning, the error of which is, as already noted, within a pitch length of the location detector (inductosyn) (for instance 2 mm). The fine-positioning error is 0.01 mm or less.

In FIG. 3, because the carriage 16 is far from the zero point of the machine, there is no signal from either of the sensors 17a or 17b. When said positioning NC data is transmitted from the input unit 11, the control unit 12 issues a command as in the case of FIG. 2, and the carriage 16 travels in the direction of the arrow at rapid speed. The signal from the sensor 17a then changes because of the platform 19b. As in the case of FIG. 2, the carriage 16 now travels in the same direction, but at slow speed. As the carriage 16 continues to travel at slow speed, the signal of the sensor 17b eventually changes to "ON". By this signal, the control unit 12 recognizes that the carriage 16 is positioned at the reference pitch point of the location detector 18. After that, of course, fine positioning is accomplished using the location detector (inductosyn).

In FIGS. 2 and 3, when the initial status of the carriage 16 provides an "ON" signal via the sensors 17 and 17a respectively, and when in both cases the positioning command has been transmitted from the control unit 12, the carriage begins to travel at the aforementioned slow speed.

It should be appreciated that, when the machine is initially connected to a numerical control system, an arrangement is made so that the zero point of the machine and the aforementioned reference pitch point (which is coincidentally determined as one and the same point) are made to coincide with each other. Thus, positioning at the zero point of the machine is identical to positioning at the reference pitch point of the location detector.

FIG. 4 shows the block diagram of the control unit 12, which operates in accordance with FIG. 2. In FIG. 4, the terminal $T_1$ receives the command signal from the input 11, the terminal $T_2$ receives the output signal from the sensor 17, and the terminal $T_3$ receives the reference pitch signal from the inductosyn (not shown). The reference numeral 111 designates a decode circuit, 112 and 127 are flip-flops, 114, 115, 116, 117, and 125 are AND circuits, 113 and 126 are NAND circuits, 188 is a rapid-traveling circuit, 119 is a slow-feed circuit, 120 is a fine-positioning circuit, 121 is a direction-decision circuit, 122 is a fixed-direction circuit, and finally, 124 is an OR circuit. When the carriage 16 is at the position shown in FIG. 2, the signal from the sensor 17 is OFF. In this status, when the positioning command is applied to the terminal $T_1$, the decode circuit 111 decodes the command and sets the flip-flop 112, and then the NAND circuit 113 and AND circuit 114 provides the output signal. Since the flip-flop 127 is in the negative condition at this stage, the AND circuit 117 provides output and causes the rapid-traveling circuit 118 to provide an output signal, which is applied to the drive circuit 13 through the OR circuit 124. In this situation the AND circuit 116 does not provide output; the NAND circuit 123 does provide output, and thus, the high-speed moving direction is decided by the output of the fixed-direction circuit 122. Accordingly, the carriage 16 always moves in a fixed direction (in the left-hand direction in FIG. 2) at rapid speed.

When the sensor 17 is engaged with the platform (or dog) 19a the output of the sensor 17 becomes "ON", the output of the AND circuit 114 disappears, and instead, the output of the AND circuit 115 is provided; the slow-feed circuit 119 then moves the carriage 16 at slow speed. The moving direction in the slow-feed phase is also determined by the fixed-direction circuit 122, thus the carriage moves in the left-hand direction in FIG. 2. Furthermore, the output of the AND circuit 115 sets the flip-flop 127. Next, when the output of the sensor 17 becomes "OFF" again, the NAND circuit 126, the AND circuit 125, and the AND circuit 116 provide output in sequence. The fine-positioning circuit 120 and the direction-decision circuit 121 are thus triggered to operate the location detector (inductosyn) for fine positioning. The flip-flop 127 is reset by the reference pitch signal from the inductosyn through the terminal $T_3$.

The prior art in FIGS. 2 through 4 has, however, many disadvantages. In the art illustrated in FIG. 2, when said positioning command has been transmitted in a status where the carriage 16 is near the stroke-end 20, (beyond the platform 19a) the carriage 16 collides with the sroke-end 20 at a rapid traveling speed, resulting in breakage of the machine, since the signal from the sensor 17 is "OFF" and the moving direction of the carriage is predetermined by the fixed-direction circuit 122 (FIG. 4). If the platform 19a for the reference position is established near the middle of the entire stroke of the carriage 16, the above accident will occur frequently, making the machine increasingly susceptible to failure. With reference to the art illustrated in FIG. 3, when the carriage 16 has traveled up to the status where the sensor 17b transmits the signal "ON", transmission of the said positioning command causes the carriage, traveling toward the stroke-end 20, to be positioned at a point several pitches ahead of said zero point in terms of the reference pitch of the detector 18. Furthermore, if the slipped-off position is even beyond the stroke-end 20, the carriage will collide with the stroke-end 20. If the zero point is established near the middle of the entire stroke of the carriage 16, the machine becomes more susceptible to this accident. As a result, positioning is set at a slipped-off point a few pitches (in terms of the reference pitch of the location detector) ahead of the real zero point. In addition, two sensors 17a and 17b are required for each spindle, resulting in a total of 6 for control of 3 spindles.

It should also be appreciated that the latest machines have the reference position of the carriage near the center of the entire stroke of the carriage, in order to reduce cutting error. In a prior machine the reference position is located near the end of the stroke of the carriage; as a result the weight of the machine and/or the carriage is not balanced at the reference position, and the change due to the unbalanced weight causes considerable cutting error.

SUMMARY OF THE INVENTION

It is an object, therefore, of the present invention to overcome the disadvantages and limitations of a prior automatic positioning system for numerical control systems by providing a new and improved system for automatically positioning the carriage at the reference point of a machine using a numerical control system.

Another object of the present invention is to provide an automatic positioning system that can operate rapidly, precisely, and at a low cost.

The above and other objects are attained by an automatic positioning system comprising (1) a fixed machine bed, (2) a platform mounted on one side of the fixed machine bed, (3) a carriage that can move along said machine bed, (4) a first sensor fixed to the carriage to detect whether the carriage is on the platform (to provide the coarse positioning of the carriage to the predetermined point of the machine bed), (5) a second sensor for detecting the fine position of the carriage, (6) a control unit for controlling the movement of the carriage (said control unit comprising an input terminal for receiving the positioning command, a decode circuit and a flip-flop for decoding said positioning command and activating the control unit, a decode/count circuit the status of which is altered by the change of the output signal of said first sensor, means for deciding the moving direction of the carriage according to the output of the first sensor and the output of said decode/count circuit, a rapid-traveling circuit for moving the carriage rapidly when said decode/count circuit is in the first status, a slow-feed circuit for moving the carriage at slow speed when said decode/count circuit is in the second status, means for actuating the fine positioning of the carriage when said decode/count circuit is in the third status, and means for connecting the outputs of the control unit to the motor drive unit).

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

Figure 1:
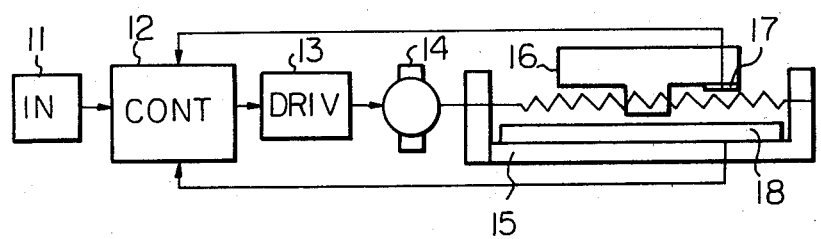
FIG. 1 illustrates a simplified block diagram of a numerical control system with one spindle.
Figure 2:
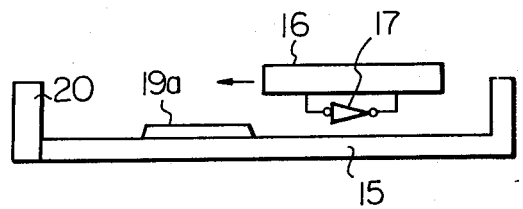
FIGS. 2 and 3 illustrate conventional positioning systems for numerical control systems.
Figure 3:
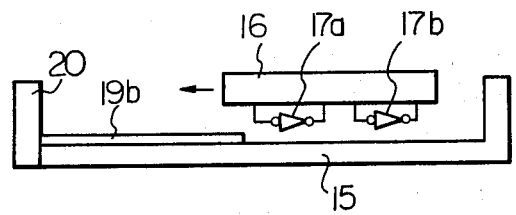
Figure 4:
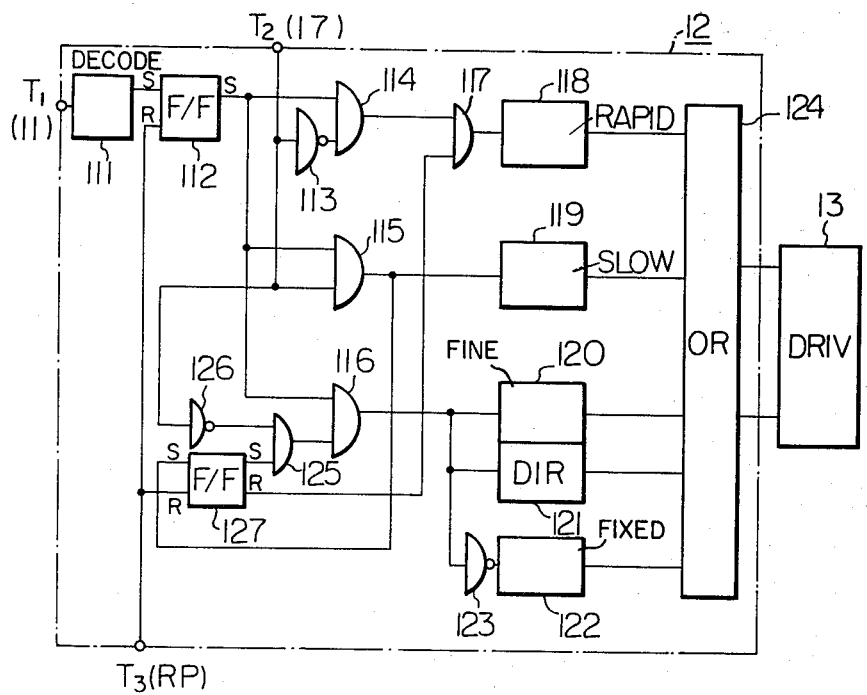
FIG. 4 is a block diagram of control unit 12.

Now, the present invention will be explained in detail in accordance with FIG. 1 and FIGS. 5 through 7. In those figures the elements having the same reference numerals as those in FIGS. 2 and 3 indicate the same members as those in FIGS. 2 and 3.

Figure 5:
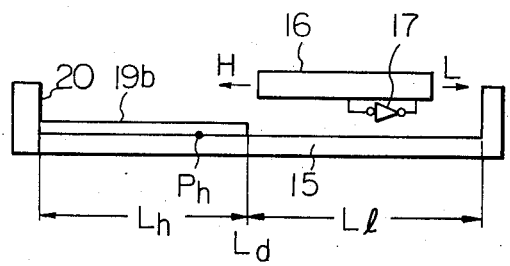
FIG. 5 shows the positioning system according to the present invention.
Figure 6:
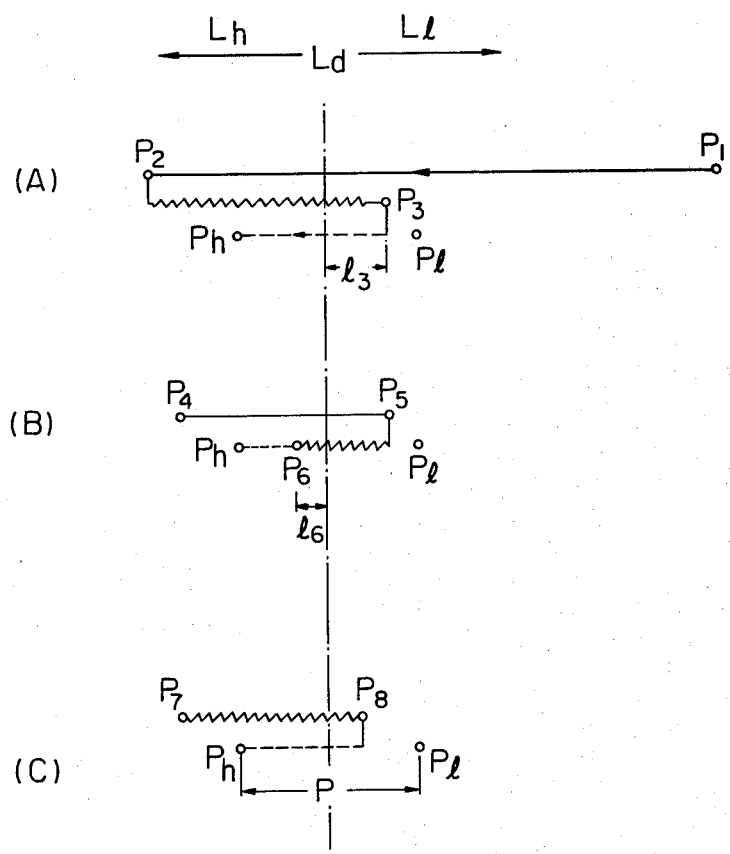
FIG. 6 is an explanatory drawing showing the operation of the present positioning system.

FIG. 5 is the positioning system according to the present invention in which the carriage 16 has only a single sensor 17; FIG. 6 shows the three embodiments of operation of the device in FIG. 5. The traveling distance of the carriage 16 is designed to be in two zones, one zone being the area with the machine bed 15 only ($L_l$) and the other zone being the machine bed with a platform 19b ($L_h$). The aforementioned zero point is to be the point $P_h$, which is in the $L_h$ zone but very close to the boundary $L_d$ of the two zones, and the distance between $P_h$ and $L_d$ is 1 pitch or less in terms of reference pitch determined by the characteristic of the detector 18 (inductosyn). $P_1$, $P_4$, and $P_7$ are the initial positions of the carriage 16 at the time said positioning command has been given to the control unit 12. $P_2$, $P_5$, and $P_8$ are the positions of the carriage 16 at the time the signals of the sensor 17 and the control unit 12 change the traveling command for the carriage 16. $P_3$ and $P_6$ are the positions of the carriage 16 at the time the signal of the sensor 17 and the control unit 12 have again changed the previous command. $P_l$ is in the $L_l$ area near the border $L_d$ and is a position 1 pitch distant, in terms of the aforementioned reference pitch, from the point $P_h$.

The first embodiment is particularly focused on the situation where the area of the zone $L_h$ is broad compared with the entire stroke of the carriage 16 (FIG. 6(A)).

(a) When the carriage 16 is in the $L_l$ zone ($P_1$) and said command is transmitted from the input unit 11, the signal of the sensor 17 is "OFF". By this signal the control unit 12 commands the drive unit 13 to move the carriage 16 at a rapid speed in the H direction of the arrow.

(b) The carriage 16 travels to the border $L_d$, where the signal of the sensor 17 changes to "ON". The above command also changes then. Said command to the drive unit 13 is now altered to enable the carriage 16 to travel in the L direction of the arrow at slow speed.

(c) As the carriage 16 again travels to the border $L_d$, the signal of the sensor 17 again changes to "OFF". At this stage coarse positioning finishes and fine positioning begins. The control unit 12 stops the above command to the drive unit 13 at the position $P_3$ and transmits a new command whereby the carriage 16 travels in the H direction of the arrow. Thus, coarse positioning has finished, and fine positioning is now carried out.

(d) The carriage 16 travels under the direction of the location detector (18) and arrives at the point $P_h$. In response to the reference pitch positioning signal of the detector 18, the control unit 12 again stops the above command to the drive unit 13 for positioning of the carriage 16.

The second embodiment concerns the case in which the carriage 16 is located in the $L_h$ area at the initial stage, as shown in FIG. 6(B).

(a) While the carriage 16 is in the $L_h$ zone ($P_4$) and when the above command is transmitted from the input device 11, because the signal of the sensor 17 is "ON", the control unit 12, triggered by this signal, commands the drive unit 13 so that the carriage 16 travels in the L direction of the arrow at rapid speed.

(b) As the carriage 16 travels and arrives at the border $L_d$, the signal from the sensor 17 changes to "OFF". The control unit 12 interrupts ($P_5$) the above command to the drive unit 13 with respect to positioning of the carriage 16 and transmits an altered command so that the carriage 16 travels in the H direction of the arrow at slow speed.

(c) As the carriage 16 travels and again arrives at the border $L_d$, the signal from the detector 17 again changes. The control unit 12 interrupts the above command ($P_6$) to the drive unit 13 with respect to the carriage 16 and transmits an altered command so that the carriage 16 travels in the H direction of the arrow sign.

(d) As the carriage 16 travels and arrives at the point $P_h$, the control unit is triggered by the reference pitch positioning signal of the detector 18 and interrupts the above carriage-positioning command to the drive unit 13.

As described in the embodiments above, it is clear that wherever it may be located in the entire stroke, the carriage can be positioned without fail to the zero point of the machine rapidly and precisely.

The third embodiment focuses on a situation where the $L_h$ zone is particularly narrow relative to the entire stroke of the carriage 16. In this situation, the speed and the direction contained in the above traveling command transmitted to the drive unit 13 from the control unit 12 depend on the "ON" or "OFF" signal of the sensor 17 and are programmed beforehand. Supposing that the signal is "ON", the carriage travels at slow speed in the L direction of the arrow, and when "OFF", at rapid speed in the H direction of the arrow, then in FIG. 6(C), (a) While the carriage 16 is in the $L_l$ zone and when the above command has been transmitted from the input unit 11, the operation proceeds in the same manner as in the first embodiment, and positioning is performed at the point $P_h$.

(b) While the carriage 16 is in $L_h$ zone ($P_7$) and when the above command has been transmitted from the input unit 11, because the detector 17 transmits the signal "ON", the control unit 12 is triggered by this signal and commands the drive unit 13 to drive the carriage 16 at slow speed in the L direction of the arrow.

(c) When the carriage 16 travels and arrives at the border $L_d$, the signal from the sensor 17 changes to "OFF". The control unit 12 commands the drive unit 13 to interrupt ($P_8$) the operation of the carriage 16 and transmits an altered command to drive the carriage in the H direction of the arrow.

(d) The carriage 16 travels and arrives at the point $P_h$. In response to the reference pitch positioning signal of the detector (inductosyn) 18, the control unit 12 commands the drive unit 13 to interrupt the above command for operation of the carriage 16.

In the above-mentioned third embodiment, rapid traveling speed is not required when the carriage is initially located near the stroke-end. Therefore, it has the advantage of reducing the load on the motor.

Figure 7:
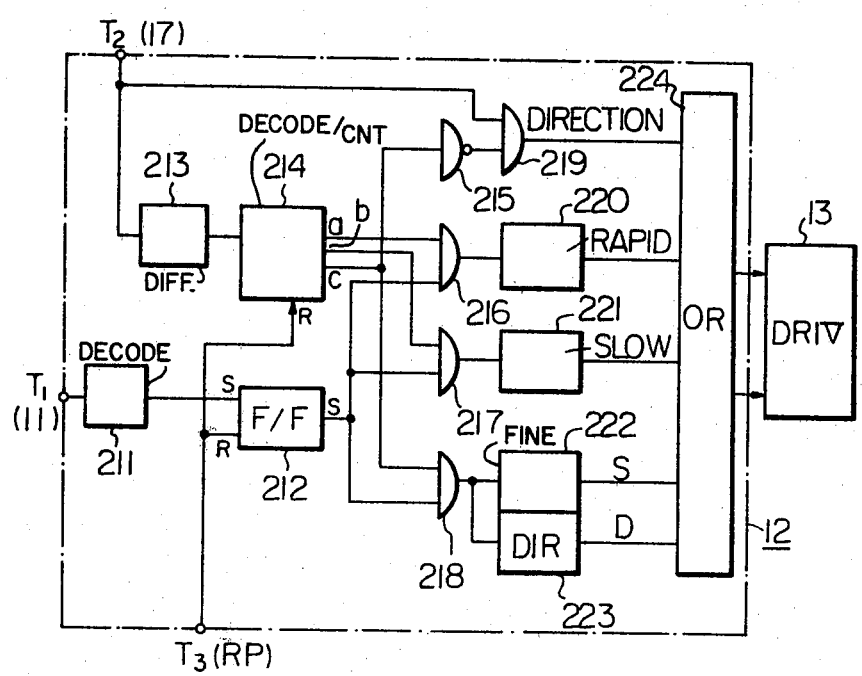
FIG. 7 is the block diagram of the control unit according to the present invention.

FIG. 7 shows the block diagram of the control unit 12 for the embodiments explained in accordance with FIGS. 6(A) and 6(B). In FIG. 7, the terminal $T_1$ receives the command signal from the input unit 11, the terminal $T_2$ receives the output signal (ON or OFF) from the sensor 17, and the terminal $T_3$ receives the reference pitch signal from the detector (inductosyn) 18. The reference numeral 211 is a decode circuit that decodes the input commands from the input unit 11; 212 is a flip-flop; 213 is a pulse differentiation circuit; and 214 is a decode/count circuit with three outputs (a, b and c), the signal of which is initially provided on the first output line (a), and each signal applied thereafter to the decode/count circuit 214 from the pulse differentiation circuit 213 changes the line which provides the signals in sequence (a-b-c-a-b-). When the reference pitch signal is applied to the terminal $T_3$, the decode/count circuit 214 is reset to the initial condition and provides a signal on the first output line (a). Numeral 215 designates a NAND circuit; 216, 217, 218 and 219 are AND circuits. Numeral 220 is a rapid-traveling circuit, 221 is a slow-feed circuit, 222 is a fine-positioning circuit, 223 is a direction-decision circuit for fine positioning, and 224 is an OR circuit.

Now, when the positioning command is applied to the terminal $T_1$, the command is decoded by the decode circuit 211, which sets the flip-flop 212. Since the output line (a) of the decode/count circuit 214 is "ON" at this stage, the AND circuit 216 provides an output signal that actuates the rapid-traveling circuit 220 to provide an output signal. This signal is applied to the drive circuit 13 of drive motor 14 (FIG. 1) through the OR circuit 224. The rotational direction of the motor (that is, the moving direction of the carrier 16) is defined by the output signal of the AND circuit 219. When the output of the sensor 17 is "ON", the output of said AND circuit 219 is also "ON", and the carriage moves in the right-hand direction as in FIG. 5, but when the output of the sensor 17 is OFF, the output of the AND circuit 219 is also OFF, and the carriage moves in the left-hand direction. One of the features of the present invention is that the moving direction of the carriage is determined by the output signal of the carriage. Thus, in the embodiment of FIG. 6(A), when the carriage stays at the point $P_1$, the carriage moves in the right-hand direction at rapid speed, and in the embodiment in FIG. 6(B) where the carriage stays at the point $P_4$, the carriage moves in the left-hand direction at rapid speed.

When the carriage passes the border point $L_d$, the output of the sensor 17 changes (from OFF to ON, or from ON to OFF), and the pulse differentiation circuit 213 provides an output signal according to said change. Then the decode/count circuit 214 switches the output signal from the first output line (a) to the second output line (b). Therefore the AND circuit 217 provides an output signal that actuates the slow-feed circuit 221 to provide an output signal. This output signal is applied to the drive circuit 13 to drive the motor 14 at slow speed through the OR circuit 224. It should be appreciated that the moving direction in the slow-speed phase is the opposite of the rapid-traveling phase, since the output of the AND circuit 219 is changed between these two phases.

When the carriage passes the border point $L_d$ again, coarse positioning is finished, and fine positioning begins. The output of the sensor 17 is changed, and it switches the output signal of the decode/count circuit 214 from the line (b) to the line (c) through the pulse differentiation circuit 213. Then the AND circuit 217 stops the output signal, and another AND circuit 218 provides the output signal; the fine-positioning circuit 222 and the direction-decision circuit in fine positioning 223 are actuated. Those circuits 222 and 223 actuate an inductosyn, the direction of which is determined at the initial stage by the output of the circuit 223. When fine positioning is finished, the reference pitch signal is provided to the terminal $T_3$ by the inductosyn, and said resets the decode/count circuit 214 and the flip-flop 212. Thus both coarse positioning and fine positioning are accomplished.

The following describes how the aforementioned reference pitch point can be solely determined taking the example of the first embodiment.

Numerical control devices with the following specifications are readily available at present.

1. Rated pulse unit of motor: $P_m = 0.001$ mm
2. Reference pitch of the location detector (inductosyn): $P = 2$ mm
3. Time constant of the motor driving device: $rm = 0.06$ sec.
4. Signal detection delay time of the sensor micro switch: $t = 0.01$ sec.

With this equipment and with the slow traveling speed of $V = 180$ mm/min, the following equation can be formulated in order to obtain the distance $l_3$ mm between the border $L_d$ and the point $P_3$ referred to in FIG. 6(A).

$$l_3 = V \cdot rm + V \cdot t$$
$$= (180/60) \cdot 0.06 + (180/60) \cdot 0.01$$
$$= 0.21 \text{ mm}$$

And the distance $l_6$ mm between the border $L_d$ and the point $P_6$ is evidently within the value of the above $l_3$ mm.

It should be appreciated that the reference point of the inductosyn resides in every 2 mm period ($P_h$, $P_l$, etc., in FIG. 6), and one of them ($P_h$), is the reference point at which the carriage must be positioned. In order to ensure that the right reference point ($P_h$), rather than the wrong reference point ($P_l$), is always found, in the cases where the carriage initially stays in the $L_l$ area (FIG. 6(A)) and where the carriage stays initially in the $L_h$ area (FIG. 6(B)), the following formula must be satisfied.

$$l_3 + l_6 \leq P (= 2 \text{ mm})$$

The distance $l_3 + l_6$ between the point $P_3$ and the point $P_6$ is $l_3 + l_6 \leq 0.21 + 0.21 = 0.42$ mm. This is smaller than the distance between the points $P_h$ and $P_l$, which is the reference pitch P=2 mm of the inductosyn. That is, it is quite possible for the points $P_3$ and $P_6$ to fall "between $P_h$ and $P_l$", which is the reference pitch position. If the positioning direction to this reference pitch position is H, then, $P_h$ can be determined at once.

Finally, the system of positioning at the reference pitch point can be in the H direction of the arrow or in the L direction of the arrow, assuming $P_l$ is the desired point, or, of the points $P_h$ and $P_l$, the one nearer to the points $P_3$ or $P_6$ can be selected.

Many modifications of the present invention are of course possible without departing from the spirit of the present invention. For instance, the platforms (dogs) 19a and 19b can be mounted underneath the carriage 16, while the sensors 17, 17a, and 17b can be mounted on the machine bed 15.

As described above in detail, the present invention permits positioning of the carriage of a machine at the zero point rapidly, precisely, and at a low cost.

The positioning system of the present invention is applicable to all numerically controlled machines that require positioning at the zero point of the machine, and this should not be construed as applicable to NC machine tools only.

From the foregoing it will now be apparent that a new and improved positioning system has been found. It should be understood of course that the embodiments disclosed are merely illustrative and are not intended to limit the scope of the invention. Reference should be made to the appended claims, therefore, rather than the specification, as indicating the scope of the invention.

What is claimed is:

1. A system for automatically positioning a carriage at the reference point of a machine using a numerical control system and having a machine bed, a platform mounted with respect to the machine bed, a carriage adapted to move along said machine bed, a first sensor disposed on said system to detect whether the carriage is on the platform to provide coarse positioning of the carriage with respect to a predetermined point on the machine bed, a second sensor disposed on said system for detecting a fine positioning of the carriage, control means for controlling the movement of the carriage characterized in that said control means comprises
    means for producing a positioning command,
    decode means for decoding said positioning command and activating said control unit,
    decode/count means responsive to changes in the output signal of said first sensor for producing first, second and third status signals,
    means for determining the direction of movement of said carriage in response to said first sensor and said decode/count means,
    rapid travelling means for moving the carriage in a first direction at high speed in response to said first status signals from said decode/count means,
    slow feed means for moving said carriage in a second direction opposite to that of said first direction at slow speed in response to said second status signals from said decode/count means when said carriage passes a predetermined point,
    means for producing fine positioning of said carriage in response to said third status signals from said decode/count means, and
    means coupled to said determining means, said rapid travelling means, said slow feed means and said actuating means for driving said carriage.

2. The invention as defined in claim 1 in which said fine positioning producing means includes means for moving the carriage in said first direction in response to said third status signals when said carriage passes said predetermined point.

3. The invention as defined in claim 1, wherein said first sensor includes a micro switch.

4. The invention as defined in claim 1 wherein the platform is on the right side of the machine bed, and the moving direction of the carriage is right when the output of the first sensor is OFF, and left when the same is ON.

5. The invention as defined in claim 1, wherein the first status of the decode/count circuit is skipped when the output of the first sensor is initially ON.

* * * * *